United States Patent [19]

Pinyan et al.

[11] Patent Number: 4,819,783
[45] Date of Patent: Apr. 11, 1989

[54] AUTOMATED INSPECTION SYSTEM AND METHOD

[75] Inventors: James A. Pinyan, Sunnyvale; B. S. Buckley; Peter D. Galitzine, both of San Jose, all of Calif.

[73] Assignee: Cochlea Corporation, San Jose, Calif.

[21] Appl. No.: 890,298

[22] Filed: Jul. 29, 1986

[51] Int. Cl.$^4$ .................. B65G 43/08; B65G 47/24
[52] U.S. Cl. .................. 198/395; 198/382; 198/735; 209/539; 209/590
[58] Field of Search .............. 198/395, 718, 735, 382; 209/576, 577, 587, 590, 539, 917

[56] References Cited

U.S. PATENT DOCUMENTS

| | | | |
|---|---|---|---|
| 1,787,383 | 12/1930 | Lacy | 198/735 |
| 2,828,851 | 4/1958 | Thomas | 198/735 X |
| 3,618,742 | 11/1971 | Blanchard et al. | 198/395 |
| 4,095,474 | 6/1978 | Hancock et al. | 73/579 |
| 4,147,252 | 4/1979 | Burkhardt | 198/735 X |
| 4,200,921 | 4/1980 | Buckley | 367/87 |
| 4,287,769 | 9/1981 | Buckley | 73/628 X |
| 4,333,558 | 6/1982 | Nonaka et al. | 198/395 X |
| 4,513,868 | 4/1985 | Culling et al. | 209/576 X |
| 4,557,386 | 12/1985 | Buckley et al. | 209/590 X |
| 4,576,286 | 3/1986 | Buckley et al. | 209/576 X |
| 4,608,646 | 8/1986 | Goodrich et al. | 198/395 X |
| 4,690,284 | 9/1987 | Buckley et al. | 209/576 X |

FOREIGN PATENT DOCUMENTS 2152568  8/1985  United Kingdom ............... 209/576

Primary Examiner—Jerome W. Massie
Assistant Examiner—John F. Letchford
Attorney, Agent, or Firm—Burns, Doane, Swecker & Mathis

[57] ABSTRACT

An automated inspection system for identifying objects by their geometrical shapes includes an orientation device wherein objects are conveyed one-by-one at constant velocity to abut at least one stationary member which urges the objects to an orientation common to other conveyed objects. After objects reach a stable common orientation, an inspection device is operated to detect waves which interact with the conveyed objects against the stationary background.

16 Claims, 2 Drawing Sheets

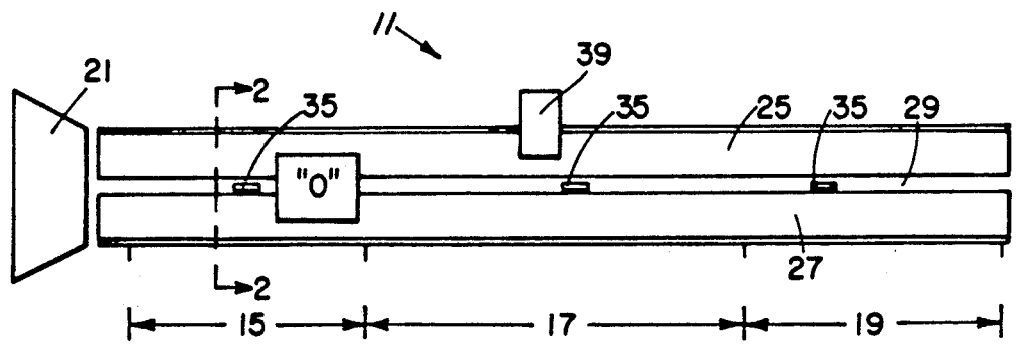
FIG._1.
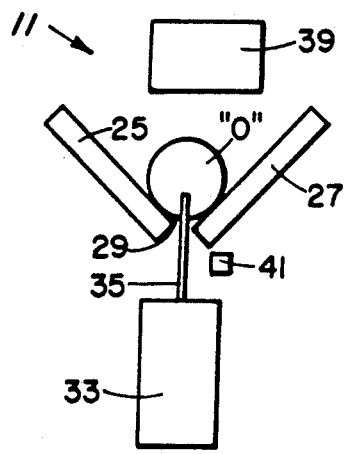
FIG._2.
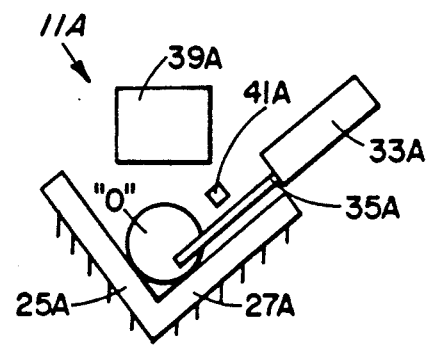
FIG._3A.
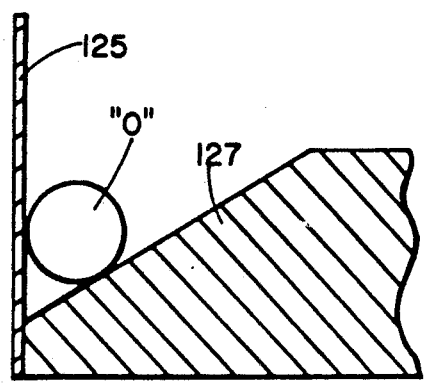
FIG._5.
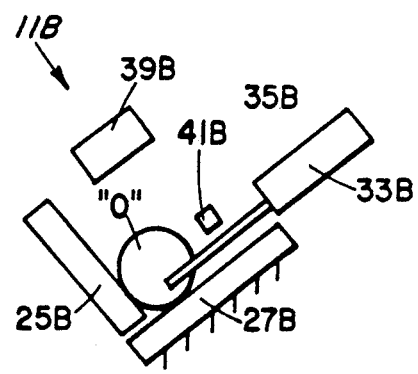
FIG._3B.

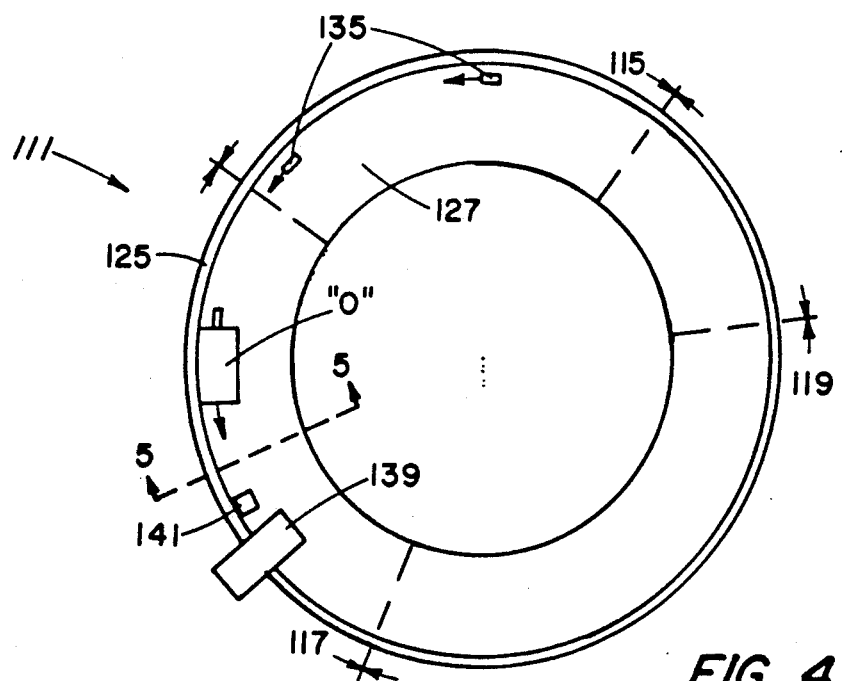
FIG._4.
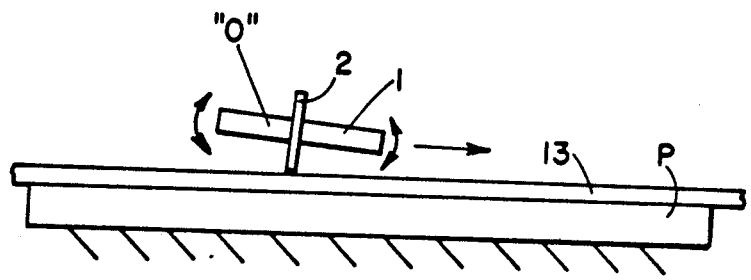
FIG._6A.
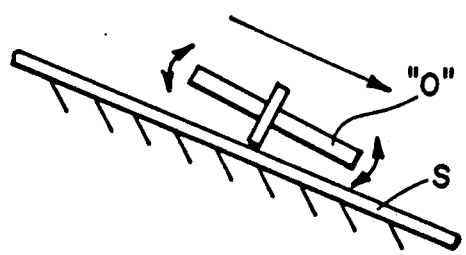
FIG._6B.
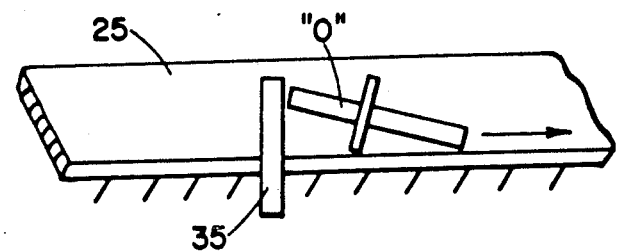
FIG._6C.

AUTOMATED INSPECTION SYSTEM AND METHOD

BACKGROUND OF THE INVENTION

1. Field of the Invention

The present invention generally relates to automated inspection systems for identifying geometric characteristics of objects and, more particularly, the present invention relates to orientation systems for use with automated inspection systems for inspecting, sorting and other handling of parts and components which require identification of their geometric characteristics.

2. State of the Art

In automated assembly operations performed by automated assembler machines such as robotic devices, it is critical that component parts which are supplied to an assembly line be non-defective. Further, it is often important that component parts be supplied to an assembly line in particular spatial orientations. One reason for such requirements is that conventional assembler machines lack sufficient dexterity and artificial intelligence to handle component parts which are presented in other than predetermined geometrical orientations. Another reason for such requirements is that conventional assembler machines lack the ability to distinguish defective or non-conforming components from acceptable ones; accordingly, if an automated assembler machine receives a non-conforming object for assembly, the machine may attempt to mount the object into the workpiece assembly regardless of whether the object is suited for the assembly. Thus if non-conforming, defective or misoriented component parts are presented to conventional automated assembler machines, there is substantial risk of disruption of assembly line operations, damage to equipment on the line, and damage to products being assembled.

To minimize the number of defective and non-conforming components which reach automated assembler machines, a typical approach is to impose quality control standards upon vendors and suppliers of the components, with the ideal result being summarized in the phrase "zero defects". Quality control measures that approach that ideal, however, involve expense and may increase the cost of components and the final product incorporating the components. Further, strict quality control at the vendor or supplier level usually does not eliminate the necessity for inspection of component parts prior to assembly. Thus, manufacturers typically must inspect all components, including high quality components prior to their being conveyed to automated assembly lines. In many factories, such inspection is performed by human inspectors; however, many inspection tasks can be difficult and tedious for humans to perform, resulting in high rates of error. Also, labor costs for human inspectors may be substantial.

To improve the effectiveness of inspections and to reduce manufacturing costs, automated inspection systems have been provided. Some automated inspection systems utilize machine vision to inspect objects, particularly small component parts. Such systems typically employ optical equipment that receives light reflected from objects during inspection. Although some success has been achieved with optical systems, such systems usually require substantial capacity for signal processing and computing in order to organize even simple geometrical configurations.

Automated inspection systems have also been suggested to provide recognition of geometric characteristics of small objects based upon transmission and reception of reflected sonic waves, thereby providing "acoustic signature" of the objects. In this regard, attention is drawn to U.S. Pat. Nos. 4,095,474; 4,200,921; 4,287,769; and 4,576,286 to the inventor Bruce S. Buckley, herein. Such systems have been successfully demonstrated and, as compared to optical systems, have been shown to require less capacity for signal processing and computation.

Still other automated inspection systems provide recognition of objects by establishing electromagnetic fields which interact with the objects. Such systems then operate to sense changes in the electromagnetic fields to obtain an "electromagnetic signature" of inspected objects. Systems of this type have been proposed using eddy currents and capacitive sensors to establish the electromagnetic fields.

In operation of automated inspection systems, such as described above, two types of errors may arise. The first type of error is usually called "false acceptance" These errors result from accepting articles which are defective or otherwise do not conform to predetermined standards. For example, in an automated inspection system for inspecting bolts, a false acceptance error would arise if a bolt with a damaged head were to pass the inspection station without rejection. By way of further example, a false acceptance error would arise if a screw, although non-defective, were to pass on inspection station which was designed to pass only non-defective bolts. False acceptance errors can severely affect automated assembly operations and thus can be quite costly and time consuming. Accordingly, workers in the art have made substantial efforts to avoid such errors, usually by adjusting automated inspection devices to prescribe narrow tolerances for objects which are judged to be acceptable. For example, in automated inspection equipment of the type based upon detection of reflected waves, false acceptance errors may be minimized by accepting only objects which produce reflected waves with narrowly defined characteristics. Likewise in inspection systems which based upon detection of changes in electromagnetic fields, false acceptance errors may be minimized by narrowly defining acceptable field changes.

Another type of error which can arise in inspection systems is the error of rejecting objects which are not defective but which, in fact, conform to predetermined standards. Such errors are usually called "false rejections". Although false rejection errors may have less serious immediate consequences than false acceptance errors, nevertheless problems can arise if rejection rates for conforming objects are high. For example, in inspection systems where objects are presented for inspection in one-by-one series, erroneous rejection of conforming components can delay assembly operations. To alleviate the effects of false rejection errors, inspection systems have been devised where all rejected objects are resubmitted though the inspection equipment; however, even such systems can be overwhelmed by high rates of false rejections.

In automated inspection systems which recognize geometrical characteristics of inspected objects, false rejection and false acceptance errors are often related to the orientation in which objects are presented for inspection. Thus, if conforming objects are presented for inspection in unusual orientations, the probability of improper rejections usually increases. Likewise, if objects are submitted for inspection while moving in a manner different than previously inspected objects, the probability of improper rejection usually increases. Types of motions which can cause false rejection errors include, for example, oscillating movement where objects teeter rapidly from one position to another.

In automated inspection equipment that operates upon the principle of detection of fields and reflected waves, it is known that statistical methods can be used to process analog electrical signals derived from the fields and reflected waves. In operation of such equipment, inspected objects are deemed acceptable only if the signals derived from inspection of the objects fall within predetermined statistical ranges, usually expressed in terms of standard deviations or variances. The statistical measures in such systems have been found to vary depending upon the orientation or motions of objects undergoing inspection; if objects are inspected while in unusual orientations or while moving in manners different than most other inspected objects, the derived statistical measures will be relatively inexact. Thus, in inspection systems which sense fields and reflected waves, unusual orientations or motion of objects during inspection should be minimized.

At this juncture, it can be appreciated that automated inspection systems can be used for purposes other than those mentioned above. For example, automated inspection systems can be used to sort objects. An example of a sorting task would be to sort nuts from bolts. In that operation, if an automated inspection system received both nuts and bolts, the inspection equipment could sort nuts from bolts by rejecting nuts on the basis that they are non-conforming bolts. When automated inspection machinery is used to accomplish sorting tasks, false acceptance errors and false rejection errors can result in unintended mixing of objects of one kind with those of another kind.

Automated inspection systems can also be utilized to improve the quality of manufacturing operations related to the inspected objects. Thus, if an automated inspection system provides information that particular dimensions of inspected objects are out of tolerance, that information can be used to adjust manufacturing machines and tools to bring the manufactured objects back into tolerance. In this function, too, unusual orientations or motions of objects during inspection can cause false rejection and false acceptance errors and, thus, can adversely affect manufacturing operations.

Further, automated inspection equipment may be utilized to assure that objects are conveyed in particular orientations. In such a case, the inspection equipment would operate to reject objects which were misoriented. Here again, false rejection errors and false acceptance errors can adversely affect operations.

It is known that automated inspection systems can be programmed to identify conforming objects by processes which may be called learning processes. In essence, such learning processes depend upon submitting objects for inspection which are known to be acceptable and then performing certain statistical computations upon signals derived from waves reflected from the objects or fields associated with the objects. We have found that the effectiveness of such learning processes, especially in terms of minimizing false acceptance errors and false rejection errors, can be improved to the extent that signals associated with acceptable objects have relatively small variances or standard deviations.

Also, we have found that such statistical measures depend upon the stability of orientation of objects presented for inspection. For example, if objects are in unusual positions or are oscillating during the period of a learning process, the ranges of the computed statistical measures will increase and this will, in turn, increase the likelihood of false acceptance and false rejection errors.

OBJECTS AND SUMMARY OF THE INVENTION

Generally speaking, an object of the present invention is to provide improvements in automated inspection systems to identify geometrical characteristics of objects while minimizing the number of defective or non-conforming objects which are erroneously accepted and minimizing the number of acceptable objects which are erroneously rejected.

Particularly, an object of the present invention is to provide automated inspection systems that operate to orient transported objects toward a common stable position for inspection against a stationary background.

More particularly, an object of the present invention is to provide an automated inspection system that orients objects toward a common stable position against a stationary support member while transporting the objects past a sensing transducer that is operated to identify at least one geometrical characteristic of the transported objects.

In summary, the present invention generally provides an automated inspection system for identifying geometrical characteristics of transported objects comprising orienting means for receiving and continuously conveying objects while urging the conveyed objects toward a common orientation against at least one stationary support member. The system also includes sensing transducers for detecting waves or fields which interact with objects against the background of the stationary support member, and means for triggering operation of the transducers.

The present invention further provides a method for automated inspection of geometrical characteristics of objects including the steps of continuously transporting objects one-by-one while aligning the transported objects to a common orientation with a stationary orientation member abutting the objects during conveyance. The method further includes, at predetermined times or locations, inspecting the objects by detecting waves or fields which interact with the objects against the stationary background of the orientation member.

In accordance with the preceding, an advantage of the present invention is the provision of an improved automated inspection system for identifying geometrical characteristics of objects by urging objects toward a common orientation against a stationary background while transporting the objects.

Further objects and advantages of the present invention may be ascertained by those skilled in the art from the following description and appended drawings, which are offered by way of example of the preferred embodiment of the present invention.

BRIEF DESCRIPTION OF THE DRAWINGS

In the appended drawings:

FIG. 1 is a plan view of an orientation device according to the present invention;

FIG. 2 is a cross-sectional view of the orientation device of FIG. 1 taken along the plane of the line 2—2 for viewing in the direction of the arrows;

FIGS. 3(a) and 3(b) are cross-sectional views corresponding to FIG. 2 of alternative embodiments of orientation devices for utilization in an inspection system in accordance with the present invention;

FIG. 4 is a plan view of another embodiment of an orientation device for use in an inspection system according to the present invention;

FIG. 5 is a cross-sectional view of the device of FIG. 4 taken along the plane of the lines 5—5 for viewing in the direction of the arrows; and FIGS. 6(a), 6(b) and 6(c) are a series of schematic views of objects being transported, which views are offered to aid in understanding the advantages of the present invention.

DETAILED DESCRIPTION OF THE PREFERRED EMBODIMENT

FIGS. 1 and 2 generally show an orientation device 11 for receiving and, continuously conveying objects "O" one-by-one at nearly constant velocity in a generally horizontal plane. During conveyance by orientation device 11, the objects are urged toward an equilibrium orientation common to the orientation taken by other conveyed objects. Generally speaking, orientation device 11 includes three sections: a loading section 15, an inspection section 17, and a rejection section 19. In loading section 15, objects are received from a feeding device, such as an inclined chute 21, arranged adjacent the end of orientation device 11. In inspection section 17, objects conveyed at generally constant velocity are inspected against a stationary background. In rejection section 19, conveyed objects can be physically manipulated depending upon whether the prior inspection step reveals that the objects conform, or do not conform, to predetermined standards.

In the embodiment illustrated in FIGS. 1 and 2 which are orientation device 11 includes first and second inclined walls 25 and 27, stationarily arranged relative to one another to form a V-shaped channel structures. Because walls 25 and 27 are straight, orientation device 11 can be said to be linear. In the particular embodiment illustrated in FIG. 2, the lower edge of wall 25 is spaced apart from, and parallel to, the lower edge of wall 27 to form a uniformly wide slot 29 which extends uninterruptedly along the length of orientation device 11. Below slot 29 is mounted a drive mechanism 33 such as an electric or hydraulic motor which is coupled to a driven member such as a roller-chain (not shown) which carries a plurality of conveying members 35 at generally equally spaced-apart locations. The conveying members 35 are mounted to project substantially upward into slot 29 between walls 25 and 27 to engage objects "O". In the illustrated embodiment conveying members 35 each have a pin-like shape, which is to say they are relatively thin and long; however, the geometrical shape of conveying members 35 is a matter of design choice depending upon the design of the orientation device 11 as well as upon the characteristics of objects conveyed in the orientation device.

The orientation device 11 further includes, at convenient locations along inspection section 17, one or more sensing transducers 39 mounted to transmit waves or fields toward conveyed objects and to detect reflected waves or field changes associated with the inspected objects. In the preferred embodiment, sensing transducers 39 are of the type which transmit and receive ultrasonic waves or low frequency electromagnetic waves. (For present purposes, low frequency electromagnetic waves are defined as those whose frequency is less than about 300 kHz.) Alternatively, sensing transducers 39 can be of the type which transmit and receive electromagnetic field information such as microwaves or light. Such transducers can be generally described as being of the type which detect interaction of waves with objects under inspection. Also included within this category are devices which sense capacitance changes and eddy currents. Although, the exact location of sensing transducers 39 is a matter of design choice, the transducers should be located sufficiently distant from the beginning of the loading section 15 that conveyed objects achieve a relatively stable orientation prior to inspection.

In practice, it is preferred to mount a position detector 41 at a convenient location along inspection section 17. The function of position detector 41 is to sense passage of a conveying member 35 or a conveyed object "O" and, in response, to trigger operation of sensing transducers 39. The design of position detector 41 is a matter of choice, and a variety of such devices are commercially available including promixity switches and photoelectric detectors.

Referring again to FIG. 1, it can be seen that rejection section 19 extends substantially beyond the location of sensing transducers 39. One purpose of rejection section 19 is to provide a time delay following inspection section 17 so that reflected signals can be processed before mechanical action is taken relative to any objects which fail to pass inspection standards. Such mechanical action may be called a "selection" action. The particular selection action taken is a matter of design choice; for example, selection action may include marking objects which fail the inspection by using ink or other means to identify the objects as defective or non-conforming. As a further example, selection action can include removal of objects from orientation device 11 for return to bulk storage or diverting objects to one or more preselected discharge chutes at the end of orientation device 11.

Operation of the complete orientation device 11 of FIGS. 1 and 2 will now be described. Initially, it can be assumed that objects have been discharged from inclined chute 21 onto loading section 15. Such discharge is preferably, but not necessarily, periodic. Then with drive mechanism 33 in operation, conveying members 35 periodically arrive at the head end of loading section 15 and travel at uniform velocity, and at generally equal intervals, along slot 29 in the direction indicated by the arrows in FIG. 1. After a conveying member 35 engages an object "O" within the channel defined by inclined walls 25 and 27, the conveying member begins to push the object toward inspection section 17. As an object travels along the channel structure, the conveyed object will be aligned at a relatively stable equilibrium orientation at the same orientation taken by objects previously conveyed. Such alignment of conveyed objects is due to the motion of conveying members 35 relative to stationary wall members 25 and 27. In operation, wall members 25 and 27 abut and support conveyed objects while urging the objects to a desired equilibrium orientation whereat the objects rest without unusual wobbling or other oscillation.

After conveyed objects enter inspection section 17, position detector 41 is tripped to initiate operation of sensing transducers 39. It should be noted that inspection of conveyed object always occurs at the same location on the orienting device 11, and that this substantially improves resolution of signals obtained from sensing transducers 41. It may also be noted that similar results can be achieved by periodically triggering operation of sensing transducers 39 at preselected time intervals if the velocity of conveying members 35 is constant. If the velocity of conveying members 35 varies, however, better precision can be obtained by triggering sensing transducers 39 only upon conveying members 35 reaching pre-selected locations.

In practice, it is preferred that conveying members 35 transport objects through the inspection section 17 at constant velocity. However, in some circumstances, it may be desirable to stop movement of an object at the time of inspection. This can be accomplished in numerous ways, including by means of conveying members 35 of the type which "drop out" at the time of inspection.

At the time of operation of sensing transducers 39, the background of an inspected object, namely wall members 25 and 27, is stationary and stable. Such a background is said to be "structured". We have found that structured backgrounds can substantially enhance the resolution of signals obtained from inspected objects and, therefore, can substantially increase inspection accuracy. The relatively good resolutions obtainable with structured backgrounds can be contrasted, for example, with relatively poorer resolutions obtained when objects are conveyed for inspection along a moving conveyor belt which, by its nature, provides unstructured background.

Referring now to FIGS. 3(a) and 3(b), there are shown two alternative embodiments of a linear orientation device 11A. In the embodiment in FIG. 3(a), first and second stationary inclined walls 25A and 27A, respectively, are arranged relative to one another to form a V-shaped channel structure which is closed at its bottom. To move objects for inspection, a drive mechanism 33a is mounted above the V-shaped channel structure and carries a series of pin-like conveying members 35a at spaced-apart locations to project downwardly to a position to movably engage objects in the channel. In this embodiment, a position detector 41A is located above the V-shaped channel structure to sense passage of conveying members 35A or a conveyed object. Also, a sensing transducer 39A is mounted to inspect objects conveyed along the V-shaped channel.

In the embodiment in FIG. 3(b), a first stationary inclined wall 25B is arranged relative to an inclined moving wall 27B to form a V-shaped channel structure. Wall 27B can be a moving belt and can contain ribs or other protuberances to engage objects to be conveyed along the V-shaped channel. The drive mechanism for moving wall 27B is conventional and, for that reason, is not shown. A position detector 41B is mounted adjacent moving wall 27B to sense passage of a conveyed object. Also in the embodiment, a sensing transducer 39B is mounted to inspect objects conveyed along moving wall 27B but is oriented so that such objects are inspected against the background of stationary wall 25A. In this embodiment, as in the prior embodiments, a conveyed object will be aligned to a relatively stable orientation common to previously conveyed objects. This is accomplished by interaction of stationary wall member 25B with moving wall 27B.

Whereas FIGS. 1 through 3(a) and (b) show orientation devices of the linear type, FIGS. 4 and 5 shows an orientation device 111 of the rotary type. Orientation device 111 generally includes a loading section 115, an inspection section 117, and a rejection section 119. As in the previously described linear device, loading section 115 receives objects from a feeding means (not shown). In inspection section 117, are located one or more sensing transducers 139 and a position detector 141 have the same function as corresponding components previously described. At rejection section 119, objects are suitably marked or otherwise handled in a manner which distinguishes acceptable objects from rejected ones.

Speaking now of the structure of orientation device 111 of FIGS. 4 and 5, the device includes an upstanding circular sidewall 125 and a stationary frustroconical wall 127. The latter wall provides a floor along which objects are transported and is bounded by circular sidewall 125. Both walls 125 and 127 are stationary. Viewed in section (FIG. 5), stationary walls 125 and 127 provide a generally V-shaped channel structures with the wall 125 functioning to retain objects traveling on frustroconical wall 127 in the channel structure.

The orientation device 111 further includes one or more sensing transducers 139 mounted at selected locations along inspection section 117. Here again, sensing transducers 139 are preferably of the type which transmit and receive low-frequency electromagnetic waves or sonic waves, and are located sufficiently distant from loading section 115 that conveyed objects achieved a relatively stable orientation prior to reaching the transducers. Also, a position detector 141 is mounted at a convenient location along inspection section 117 to trigger operation of sensing transducers 139. Again, the design of position detector 141 is a matter of choice.

Operation of the orientation device 111 of FIGS. 4 and 5 will now be described. Initially, objects for inspection are discharged generally periodically onto loading section 115. Concurrently, conveying members 135 move along frustroconical wall 127 and, thus, periodically engage objects within loading section 115. Upon such engagement, the conveying members urge objects to travel in the V-shaped channel structure along the circular path. During such travel, the conveyed objects are supported by frustroconical wall 127 and aligned toward the same stable equilibrium positions as other objects similarly conveyed. Such alignment is due to the interaction of stationary inclined walls 125 and 127 and conveying members 135. When conveyed objects reach inspection section 117, the objects are generally all in the same orientation and are stable.

At inspection section 117, position detector 141 is tripped to initiate operation of sensing transducers 139. In this particular system, as in the previously-described embodiments, inspection of conveyed object always occurs at the same location on the orienting device 111, thereby improving resolution. Also, at the same time of inspection, the background of the inspected objects is stationary and stable in this embodiment.

FIGS. 6(a), (b), and (c) diagrammatically illustrate some of the principles of operation of an orientation device according to the present invention as compared to ordinary conveying devices. Thus, FIG. 6(a) depicts an object "O" carried by a conventional traveling belt B in the horizontal direction; the conveyed object is relatively unstable and may unpredictably teeter back and forth as indicated by the arcuate arrows. Belt B provides only support from below the conveyed object. During any inspection of an object on belt B, the belt would present a moving background relative to a stationary inspection device, thus adversely affecting resolution of signals derived from an inspection transducer which depends upon waves impinged upon, or fields interacting with, an inspected object. Moreover, the thickness of belt B may vary in practice, thus further adversely affecting the resolution of inspection waves and fields as compared to a stationary background.

FIG. 6(b) shows an object "O" sliding down a conventional inclined surface S under the influence of gravity. Here again, the moving object is free to oscillate during travel and, therefore, may be in an unstable and unpredictable orientation at the time of inspection. Also, objects conveyed by the structure in FIG. 6(b) may travel down surface S at non-constant velocities.

By way of contrast to FIGS. 6(a) and 6(b), FIG. 6(c) depicts an object traveling horizontally against a stationary inclined wall under the influence of conveying member 35. The inclined wall can be considered to be part of a V-shaped channel structure as previously described herein. In this environment, the conveyed object is urged to a stable equilibrium orientation, is constrained from oscillatory motion, can be consistently inspected against an unvarying background, and can be easily transported at constant velocity.

Although the present invention has been described with particular reference to the illustrated preferred embodiments, such disclosure should not be interpreted as limiting. Various other alterations and modifications will no doubt become apparent to those skilled in the art after having read the preceding disclosure. For example, it is clear that an orientation device can be arranged to convey objects at an angle to horizontal and that, in such an arrangement, gravity may be utilized to assist in damping oscillatory motion of the conveyed objects. In view of this variation and others, it is intended that the appended claims be interpreted as covering all alternative embodiments and equivalents as fall within the spirit and scope of the present invention.

We claim:

1. A method for automated inspection of objects to determine characteristics of objects by detecting changes in fields of waves interacting with the objects against an unmoving background, comprising the steps of:
   receiving and continuously transporting objects one-by-one at generally equal intervals against an orientation means which urges said objects, during transport, to change position toward a stable equilibrium orientation in common with an orientation taken by other transported objects;
   initiating inspections of transported objects at a predetermined location during transport; and
   inspecting transported objects by detecting fields which interact with said transported objects and with the background provided by the orientation means while the objects are in a common and stable equilibrium orientation.

2. A method as defined in claim 1 wherein the stationary orientation means includes at least one non-horizontal wall member disposed to direct objects, during transport, toward a common orientation.

3. A method as defined in claim 1 including contacting objects for stabilization during transport with said first and second wall members.

4. A method as defined in claim 1 including the steps of supporting transported objects on a planar surface and transporting the objects in a linear path.

5. A method as defined in claim 1 wherein the objects are conveyed at generally constant velocity.

6. An automated inspection system for identifying characteristics of objects by detecting changes in fields of waves interacting with the objects against an unmoving background, comprising:
   orienting means for receiving and continuously conveying objects one-by-one for inspection at generally equal intervals and at a generally constant velocity, the orienting means including at least one traveling means to engage and convey objects for inspection and at least one stationary orientation member mounted to abut against objects during conveyance to urge said objects to change position and move toward a stable equilibrium orientation common to the orientation taken by other objects during conveyance;
   inspection means including wave transmitting and receiving means to detect fields which interact with objects conveyed by the orienting means and the background provided by said at least one stationary orientation member, and signals processing means to generate signals derived from the fields to provide identification of at least one geometrical characteristic of said conveyed objects; and
   triggering means operated in coordination with the orienting means to initiate operation of the inspection means upon object being conveyed to a predetermined location against the background of the at least one orientation member.

7. A system as defined in claim 6 wherein said stationary orientation member includes at least one non-horizontal wall member located located to contact objects during conveyance to urge conveyed objects toward a stable orientation common to other conveyed objects.

8. A system as defined in claim 6 wherein the orienting means includes first and second non-horizontal wall members arranged to contact objects during conveyance to urge said objects toward a stable orientation common to the orientation of other conveyed objects.

9. A system as defined in claim 8 wherein said first and second non-horizontal wall members are arranged opposite one another and inclined to define a generally V-shaped channel structure through which objects are conveyed individually.

10. A system as defined in claim 9 wherein the basal line of said V-shaped channel structure is generally horizontal.

11. A system as defined in claim 9 wherein the orienting means includes pin-like members to engage and convey objects along the V-shaped channel structure.

12. A system as defined in claim 9 wherein said first and second non-horizontal wall members are spaced apart from one another to form a slot extending along the basal line of the V-shaped channel structure.

13. A system as defined in claim 12 further including pin-like members mounted to travel within said slot and to project upwardly therefrom at spaced-apart locations to engage and convey objects individually within said V-shaped channel structure.

14. A system as defined in claim 8 wherein said first and second non-horizontal wall members are arranged relative to one another to stabilize the orientation of conveyed objects.

15. A machine for automatically identifying characteristics of objects by detecting changes in fields of waves interacting with the objects against an unmoving background, comprising:
   orienting means for receiving and continuously conveying objects one-by-one for inspection at generally equal intervals, the orienting means including at least one stationary non-horizontal wall member located to contact and change the position of said objects during conveyance so that conveyed objects are urged toward a stable equilibrium orientation common to the orientation of other conveyed objects, said wall member being arranged relative to another wall member to define a generally V-shaped channel structure;

conveying traveling mebmers to engage and individually convey objects along the V-shaped channel structure;

inspection means including means to detect the fields which interact with conveyed objects and with the background provided by said at least one wall member while the objects are in common and stable equilibrium position; and position detecting means to initiate operation of the inspection means upon objects being conveyed to a predetermined location.

16. A machine as defined in claim 15 wherein said first and second non-horizontal wall members are spaced apart from one another to form a slot extending at the base of the V-shaped channel structure and wherein said conveying members are mounted to travel at a generally constant velocity within said slot and to project upwardly therefrom at spaced-apart locations to engage and convey objects individually.

* * * * *